Patented Apr. 28, 1936

2,038,690

UNITED STATES PATENT OFFICE 2,038,690

HIGH ELECTRICAL RESISTANT SOFT GLASS COMPOSITION

William C. Taylor, Corning, N. Y., assignor to Corning Glass Works, Corning, N. Y., a corporation of New York No Drawing. Application February 7, 1934, Serial No. 710,181

3 Claims. (Cl. 106—36.1)

This invention relates to glass and has for its object to make a new and useful glass having certain special characteristics fitting it for use as a material from which to make stems and flares of electric lamps.

The methods employed in the manufacture of electric lamps and the conditions under which they operate render the possession of the special characteristics highly valuable, and, although the desirability of such characteristics has long been known and much research has been expended in connection therewith, no glass has heretofore been devised combining the desired characteristics to the extent that does the glass herein claimed.

The desired characteristics are:

A coefficient of thermal expansion of approximately .000009.

An electrical resistivity at a temperature of 350° C. of at least $160 \times 10^6$ ohms per cm. cube or higher.

A low softening point, that is 652° C., or less, the softening point being that temperature at which a thread of glass one millimeter in diameter and twenty-three centimeters long will elongate at the rate of one millimeter per minute when heated over the upper nine centimeters of its length.

A low specific gravity.

Any and all of these properties may easily be obtained at the sacrifice of others. The problem solved by me has been to obtain them all in one glass.

I have discovered that when the alkali of a lead-containing glass consists of potash and soda in the proper ratio, namely two to three parts of potash to one part of soda, a higher resistivity is obtained than with the same amount of alkali as either potash or soda alone. I have further discovered that in such a glass the addition of a suitable amount of barium oxide and boric oxide will cause a further increase in the resistivity without seriously affecting the softening point, expansion coefficient or specific gravity.

As an example of a glass falling within the limits and scope of my invention, I give the following composition:

| | Per cent |
|---|---|
| $SiO_2$ | 57.7 |
| $Na_2O$ | 3.7 |
| $K_2O$ | 8.9 |
| $PbO$ | 20.5 |
| $BaO$ | 6.9 |
| $B_2O_3$ | 1.0 |
| $R_2O_3$ | 1.3 |

This glass possesses the following properties:

Electrical resistivity $160 \times 10^6$ ohms per cm. cube
Softening point_____652° C
Expansion coefficient..0000089
Specific gravity_____2.96

The above composition illustrates the preferred embodiment of my invention and may be varied somewhat, subject to the following considerations:

The silica content is relatively low, which tends toward a low softening point, a higher expansion and also a lower resistivity. I have found that the silica content may vary from about 55% to 60% without making the glass unduly hard.

The glass contains both potash and soda, which are in the ratio of 2.4 to 1. Since the presence of alkali reduces the resistivity more than any other constituent, it is desirable to keep this as low as possible. However, too low alkali leads to higher softening point and lower expansion, particularly when the alkali is mostly potash. I have found that by combining soda and potash in the above mentioned ratio I can obtain maximum resistivity for a given alkali content while permitting a suitable softness. The soda may vary between 3% and 4% and the potash between 8% and 10% without unduly affecting the resistivity or disturbing the softening point and expansion coefficient.

The glass contains lead oxide and barium oxide, both of which tend to raise the resistivity and lower the softening point while maintaining a high expansion. The lead oxide may vary between 19% and 21.5% and the barium oxide between 6.5% and 7.3%.

Boric oxide, although it raises the resistivity and lowers the softening point, has a low expansion factor and hence must be used sparingly to avoid lowering the expansion too much. I have found that from 1% to 1.1% is the most desirable amount of boric oxide.

What I claim is:

1. A glass containing 55% to 60% $SiO_2$, 3% to 4% $Na_2O$, 8% to 10% $K_2O$, 19% to 21.5% PbO, 6.5% to 7.3% BaO, and 1.0% to 1.1% $B_2O_3$.

2. A glass containing 55% to 60% $SiO_2$, 3% to 4% $Na_2O$, 8% to 10% $K_2O$, 19% to 21.5% PbO, 6.5% to 7.3% BaO, and 1.0% to 1.1% $B_2O_3$, the $K_2O$ being approximately 2.4 times the $Na_2O$.

3. A glass comprising approximately 57.7% $SiO_2$, 3.7% $Na_2O$, 8.9% $K_2O$, 20.5% PbO, 6.9% BaO, 1.0% $B_2O_3$ and 1.3% $R_2O_3$.

WILLIAM C. TAYLOR.